(12) United States Patent
    Barcelou

(10) Patent No.: US 8,632,007 B2
(45) Date of Patent: Jan. 21, 2014

(54) AUTOMATED TRANSACTION MACHINE

(75) Inventor: David M. Barcelou, Concord, NH (US)

(73) Assignee: Transaction Holdings Ltd., LLC, Wilmington, DE (US)

( * ) Notice: Subject to any disclaimer, the term of this patent is extended or adjusted under 35 U.S.C. 154(b) by 0 days.

(21) Appl. No.: 13/621,193

(22) Filed: Sep. 15, 2012

(65) Prior Publication Data

US 2013/0008952 A1    Jan. 10, 2013

Related U.S. Application Data

(63) Continuation of application No. 12/951,866, filed on Nov. 22, 2010, now Pat. No. 8,118,222, which is a continuation of application No. 11/982,186, filed on Oct. 31, 2007, now Pat. No. 7,837,101, which is a continuation of application No. 11/818,217, filed on Jun. 13, 2007, now abandoned, which is a continuation of application No. 11/123,982, filed on May 6, 2005, which is a continuation of application No. 09/180,558, filed as application No. PCT/US97/08089 on May 9, 1997, now Pat. No. 6,945,457.

(60) Provisional application No. 60/017,533, filed on May 10, 1996.

(51) Int. Cl.
    *G06K 5/00*    (2006.01)
(52) U.S. Cl.
    USPC .......................................... 235/380; 235/379
(58) Field of Classification Search
    USPC ............... 235/379, 375, 383, 381, 380, 382.5
    See application file for complete search history.

(56) References Cited

U.S. PATENT DOCUMENTS

| RE30,773 E | 10/1981 | Glaser et al. |
| 4,454,670 A | 6/1984 | Bachmann et al. |
| 4,497,261 A | 2/1985 | Ferris et al. |
| 4,671,512 A | 6/1987 | Bachman et al. |
| 4,815,741 A | 3/1989 | Small |
| 4,869,500 A | 9/1989 | Williams |
| 4,962,866 A | 10/1990 | Phillips |
| 5,036,461 A | 7/1991 | Elliott et al. |
| 5,038,022 A | 8/1991 | Lucero |
| 5,042,809 A | 8/1991 | Richardson |
| 5,056,019 A | 10/1991 | Schultz et al. |

(Continued)

FOREIGN PATENT DOCUMENTS

| JP | 3-98366 | 4/1991 |
| WO | WO-92/17856 | 10/1992 |

OTHER PUBLICATIONS

"Ameritech and Cash Station Inc. Announces Prepaid Phone Card Deal" Newswire, Oct. 17, 1996.

(Continued)

*Primary Examiner* — Thien M Le
(74) *Attorney, Agent, or Firm* — Tannenbaum, Helpern, Syracuse & Hirschtritt LLP

(57) ABSTRACT

An automated retail terminal in which a plurality of goods and/or services are provided in an integrated system. The integrated system generally avoids duplicating hardware or functions in the course of delivering the goods or services offered, so for example in a combination ATM and Internet kiosk the same credit card or smart card reader is used for both the ATM and the Internet kiosk functions, the same control screen activates the ATM functions and the Internet functions, and etc.

24 Claims, 9 Drawing Sheets

(56) References Cited

U.S. PATENT DOCUMENTS

| | | |
|---|---|---|
| 5,083,271 A | 1/1992 | Thacher et al. |
| 5,093,787 A | 3/1992 | Simmons |
| 5,095,908 A | 3/1992 | Belikan et al. |
| 5,147,021 A | 9/1992 | Maruyama et al. |
| 5,183,142 A | 2/1993 | Latchinian et al. |
| 5,198,976 A | 3/1993 | Form et al. |
| 5,227,778 A | 7/1993 | Vacon |
| 5,256,863 A | 10/1993 | Ferguson et al. |
| 5,280,527 A | 1/1994 | Gullman et al. |
| 5,297,030 A | 3/1994 | Vassigh et al. |
| 5,324,035 A | 6/1994 | Morris et al. |
| 5,339,239 A | 8/1994 | Manabe et al. |
| 5,351,296 A | 9/1994 | Sullivan |
| 5,371,797 A | 12/1994 | Bocinsky |
| 5,397,886 A | 3/1995 | Mos |
| 5,429,361 A | 7/1995 | Raven et al. |
| 5,442,567 A | 8/1995 | Small |
| 5,450,938 A | 9/1995 | Rademacher |
| 5,465,206 A | 11/1995 | Hilt et al. |
| 5,513,117 A | 4/1996 | Small |
| 5,539,621 A | 7/1996 | Kikinis |
| 5,543,607 A | 8/1996 | Watanabe et al. |
| 5,548,632 A | 8/1996 | Walsh et al. |
| 5,550,816 A | 8/1996 | Hardwick et al. |
| 5,559,885 A | 9/1996 | Drexler et al. |
| 5,583,933 A | 12/1996 | Mark |
| 5,584,362 A | 12/1996 | Dumont |
| 5,589,855 A | 12/1996 | Blumstein et al. |
| 5,649,117 A | 7/1997 | Landry |
| 5,650,065 A | 7/1997 | Sewell |
| 5,677,521 A | 10/1997 | Garrou |
| 5,689,101 A | 11/1997 | Kikuchi et al. |
| 5,695,400 A | 12/1997 | Fennell et al. |
| 5,724,521 A | 3/1998 | Dedrick |
| 5,727,154 A | 3/1998 | Fry et al. |
| 5,728,999 A | 3/1998 | Teicher |
| 5,734,823 A | 3/1998 | Saigh et al. |
| 5,739,876 A | 4/1998 | Stewart |
| 5,752,246 A | 5/1998 | Rogers et al. |
| 5,764,789 A | 6/1998 | Pare et al. |
| 5,766,076 A | 6/1998 | Pease et al. |
| 5,768,382 A | 6/1998 | Schneier et al. |
| 5,781,632 A | 7/1998 | Odom |
| 5,784,439 A | 7/1998 | Nagelmann et al. |
| 5,802,199 A | 9/1998 | Pare et al. |
| 5,818,361 A | 10/1998 | Acevedo |
| 5,821,514 A | 10/1998 | Kikuchi et al. |
| 5,831,862 A | 11/1998 | Hetrick et al. |
| 5,838,665 A | 11/1998 | Kahn et al. |
| 5,850,076 A | 12/1998 | Morioka et al. |
| 5,865,470 A | 2/1999 | Thompson |
| 5,877,485 A | 3/1999 | Swartz |
| 5,884,288 A | 3/1999 | Chang et al. |
| 5,889,268 A | 3/1999 | Swartz |
| 5,897,625 A | 4/1999 | Gustin et al. |
| 5,902,983 A | 5/1999 | Crevelt et al. |
| 5,905,908 A | 5/1999 | Wagner |
| 5,917,913 A | 6/1999 | Wang |
| 5,987,439 A | 11/1999 | Gustin et al. |
| 6,003,763 A | 12/1999 | Gallagher et al. |
| 6,017,063 A | 1/2000 | Nilssen |
| 6,081,791 A | 6/2000 | Clark |
| 6,085,177 A | 7/2000 | Semple |
| 6,144,848 A | 11/2000 | Walsh et al. |
| 6,149,055 A | 11/2000 | Gatto |
| 6,202,924 B1 | 3/2001 | Saunders |
| 6,318,536 B1 | 11/2001 | Korman et al. |
| 6,354,490 B1 | 3/2002 | Weiss et al. |
| 6,366,397 B1 | 4/2002 | Genjima et al. |
| 6,371,368 B1 | 4/2002 | Owens et al. |
| 6,386,451 B1* | 5/2002 | Sehr .............................. 235/384 |
| 6,438,527 B1 | 8/2002 | Powar |
| 6,443,359 B1 | 9/2002 | Green et al. |
| 6,487,538 B1 | 11/2002 | Gupta et al. |
| 6,487,542 B2 | 11/2002 | Ebata et al. |
| 6,550,670 B1 | 4/2003 | Lewis et al. |
| 6,565,000 B2* | 5/2003 | Sehr .............................. 235/384 |
| 6,583,813 B1 | 6/2003 | Enright et al. |
| 6,607,124 B1 | 8/2003 | Junkins et al. |
| 6,684,269 B2 | 1/2004 | Wagner |
| 6,694,387 B2 | 2/2004 | Wagner |
| 6,708,176 B2 | 3/2004 | Strunk et al. |
| 6,745,259 B2 | 6/2004 | Wagner |
| 6,850,996 B2 | 2/2005 | Wagner |
| 6,898,838 B2 | 5/2005 | Gordon |
| 6,907,476 B2 | 6/2005 | Wagner |
| 6,910,634 B1* | 6/2005 | Inose et al. .................... 235/486 |
| 6,965,816 B2* | 11/2005 | Walker ........................... 701/16 |
| 7,024,385 B1 | 4/2006 | Adcock et al. |
| 7,040,533 B1 | 5/2006 | Ramachandran |
| 7,151,780 B1 | 12/2006 | Belscher et al. |
| 7,156,300 B1 | 1/2007 | Dentlinger |
| 7,444,411 B2 | 10/2008 | Sung |
| 2001/0016825 A1 | 8/2001 | Pugliese |
| 2001/0044775 A1* | 11/2001 | Saito et al. ..................... 705/40 |
| 2002/0100803 A1* | 8/2002 | Sehr .............................. 235/384 |
| 2003/0120597 A1 | 6/2003 | Drummond |
| 2005/0077358 A1 | 4/2005 | Boehm et al. |
| 2005/0181875 A1 | 8/2005 | Hoehne et al. |
| 2005/0246292 A1 | 11/2005 | Sarcanin |
| 2006/0206246 A1* | 9/2006 | Walker ........................... 701/16 |
| 2012/0160922 A1* | 6/2012 | Cau et al. ....................... 235/492 |

OTHER PUBLICATIONS

"Size Up Your Needs", LEI USA Advertisement, OCR Debit Card Vending Machine, TeleCard World 95 East, Sep. 1995.
R. Brown, et al., The Guide to United States Popular Culture, Popular Press (2001).
Betsy Maestro, The Story of Money, Canon Books (1993).
World Book Dictionary (1995) at p. 138.
J. McAndrews, Automated Teller Machine Network Pricing—A Review of the Literature, Review of Network Economics, vol. 2, 146-158 (Jun. 2003).
D. Humphrey, Delivering Deposit Services; ATMs Verses Pranches Federal teem.: Bank of Richmond Economic Quarterly vol. 80, 58-91 (Spring 1994).
ATMs Through History, GSQ vol. 6, No. 3 (Sep. 2003).
1994 ACI Base 24-ATM Diebold 1 OOx Series Support Manual.
Speaking a Common ATM Language, Credit Card Management Magazine (Apr. 2003).
2005 Diebold Brochure "ATMs Security Office".
The IFX Standard: Global Adoption is Only a Matter of Time Celent (2006).
2005 NCR Brochure.
1997 NCR Model5670 ATM and Model 5675 ATM Brochures.
J. Rawe. A Mini-Mall in Your ATM, Time p. 61 (Apr. 8, 2002).
7-Eieven to expand Vcom Kiosks to 1000 stores, Dallas Business Journal (Jul. 9, 2002).
A. All, Vcom = More Units, More Functionality, Kiosk Marketplace (Aug. 6, 2002).
A. All, 7-Eleven's Vcom Wins Raves at RD, ATM Marketplace (Nov. 13, 2002).
International 2002 ATM Award Winners.
NCR, The Automation Revolution: Self-Service as to Strategic Channel (2005).
FNC Resolution (Oct. 24, 1995).
Besser, The Information Superhighway (1995).
Dial-Up ATMs Ring in Changes in the ATM World, Bank Network News 15 (16) (Jan. 13, 1997).
R. Zakon, "Hobbes' Internet Timeline v 8.2", www.zakon.org/robertlinternet/timeline (2006).
A Little History of the World Wide Web, www.w3.org/History.html(Circa 1995).
AT&T Advertisement "You Will" (1994).
Self Service Kiosk Product Update, Creative Strategies (1995).
F. Koelsch, The Infomedia Revolution (1995).
Jay W. Giesen, Vice President and General Manager, Vcom, Powerpoint Presentation to 7-Eieven, Inc. (Jul. 29, 2003).
Jan. 1995 GAO Report, "Information Superhighway".

(56) References Cited

OTHER PUBLICATIONS

Dec. 4, 1996 Diebold Press Release.
Subrizi et al., "The Virtual ATM" by Alex Subrizi et al. Bank Marketing (Nov. 1994) pp. 17-20.
Vizard, "Building the Information Superhighway" by Frank Vizard Popular Mechanics (Jan. 1994) pp. 29-33.
James McAndrews, The Evolution of Shared ATM Networks, Business Review (May/Jun. 1991).
James Kobielus, Prospects are golden for wireless data services, Network World (Nov. 7, 1994).
NTIA, Information Superhighway, Mar. 1995.
Wikipedia entry for "Information Superhighway", May 2006.

* cited by examiner

AUTOMATED TRANSACTION MACHINE

CROSS-REFERENCE TO RELATED APPLICATIONS

This application is a continuation of U.S. application Ser. No. 09/180,558, filed on Nov. 6, 1998, which is a national stage of PCT/US97/08089 which claims the benefit of the filing date of U.S. Provisional Patent Application No. 60/017,533 filed May 10, 1996, the disclosure of which is hereby incorporated herein by reference.

FIELD OF THE INVENTION

The invention relates to retail terminals for automated transactions and a unique system design therefor.

BACKGROUND OF THE INVENTION

For decades, retail sales and services have been automated to greater or lesser degrees. Historically in many European countries, shopkeepers of bakeries and other purveyors have long provided simple vending machines to dispense their products at their street entrances after business hours. More ambitiously automated restaurants are already legendary in the history of the United States. Other and more recent entrants in the automated retail sales and service industries include automated teller machines (ATMs), custom greeting card kiosks, automated lottery machines and other home and commercial business terminals including various Internet services available via personal computer.

Retail terminal technology generally, however, has been pervaded by a fundamental flaw which itself has gone completely unrecognized. This flaw becomes apparent when one considers the piecemeal character of retail terminals of all types in the applicable prior art. Without any known exception, automated retail functions are provided only to address particular and narrow needs. An ATM may dispense postage stamps, but treats the stamp sheets virtually as an alternate currency in a limited menu of deposit and cash access services. Lottery machines dispense lottery tickets; insurance machines dispense insurance policies; and fancy pay telephones and the most advanced home computers function primarily as old-fashioned credit card order lines for the various products and services available online. In short, even in the most recent instances the only advantage in retail automation has been the same as it has been for many years—the elimination of the human attendant.

A need thus remains for an innovation in the area of automated retail goods and services in which an automated transaction machine does more than merely provide existing goods and services in a simple automated way.

SUMMARY OF THE INVENTION

In order to meet this need, the present invention is an automated retail terminal in which a plurality of goods and/or services is provided in an integrated system. The integrated system generally avoids duplicating hardware or functions in the course of delivering the goods or services offered, so for example in a combination ATM and Internet kiosk the same credit card or smart card reader is used for both the ATM and the Internet kiosk functions, the same control screen activates the ATM functions and the Internet functions, and etc. The overall importance—and the details concerning—the integrated system aspect of the present automated transaction terminal will become more apparent in the foregoing description.

DETAILED DESCRIPTION OF THE INVENTION

The present invention is an automated transaction machine comprising an automated retail terminal which provides a plurality of goods and/or services from an integrated and automated system. Two or more goods and/or services are provided not only in combinations heretofore unavailable, but in an integrated system design in which duplication of effort (and hardware) is largely or completely eliminated.

Figure 1:
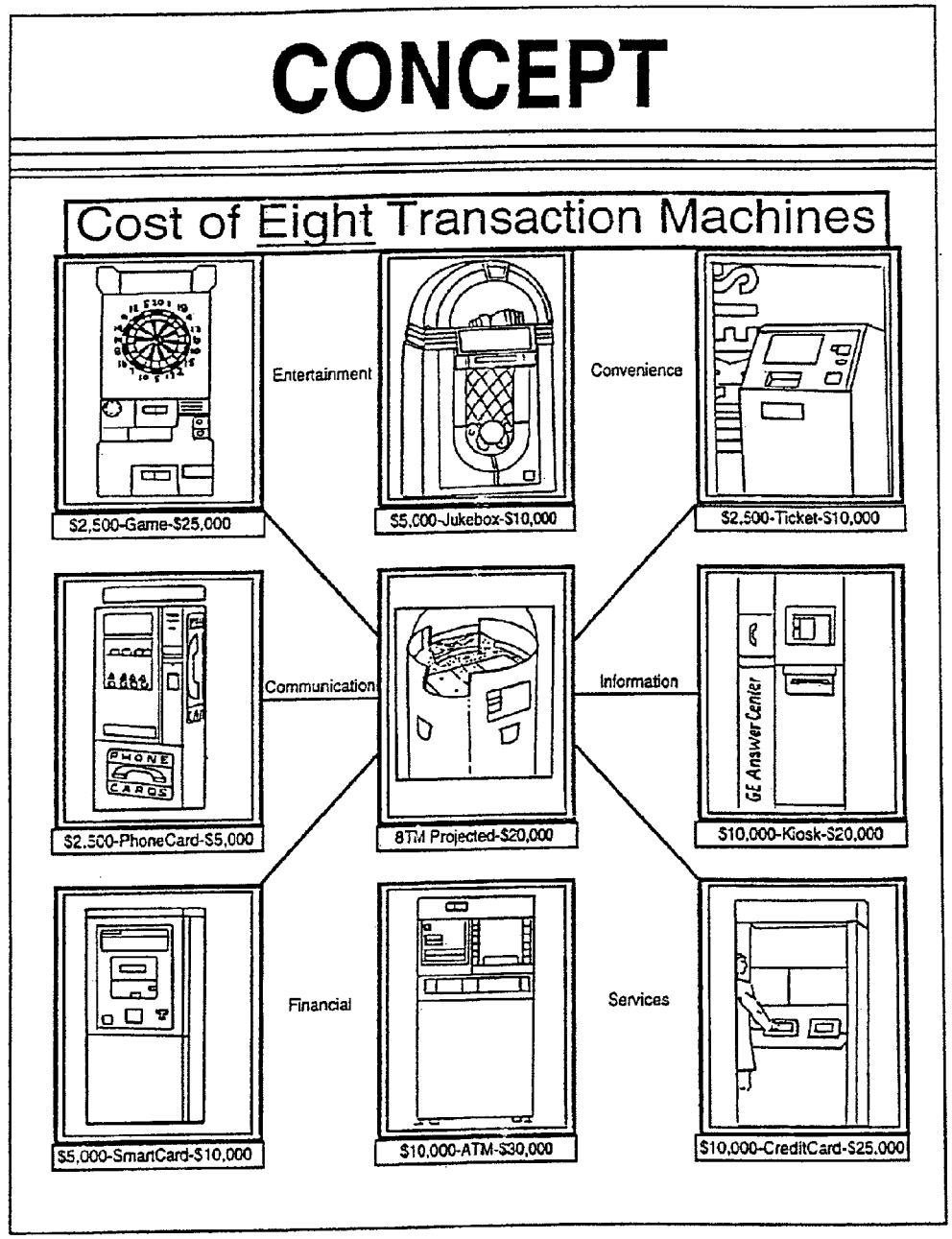
FIG. 1 is a schematic entitled "CONCEPT" which illustrates the various existing goods arid services machines which can be combined in accordance with the invention.
Figure 2:
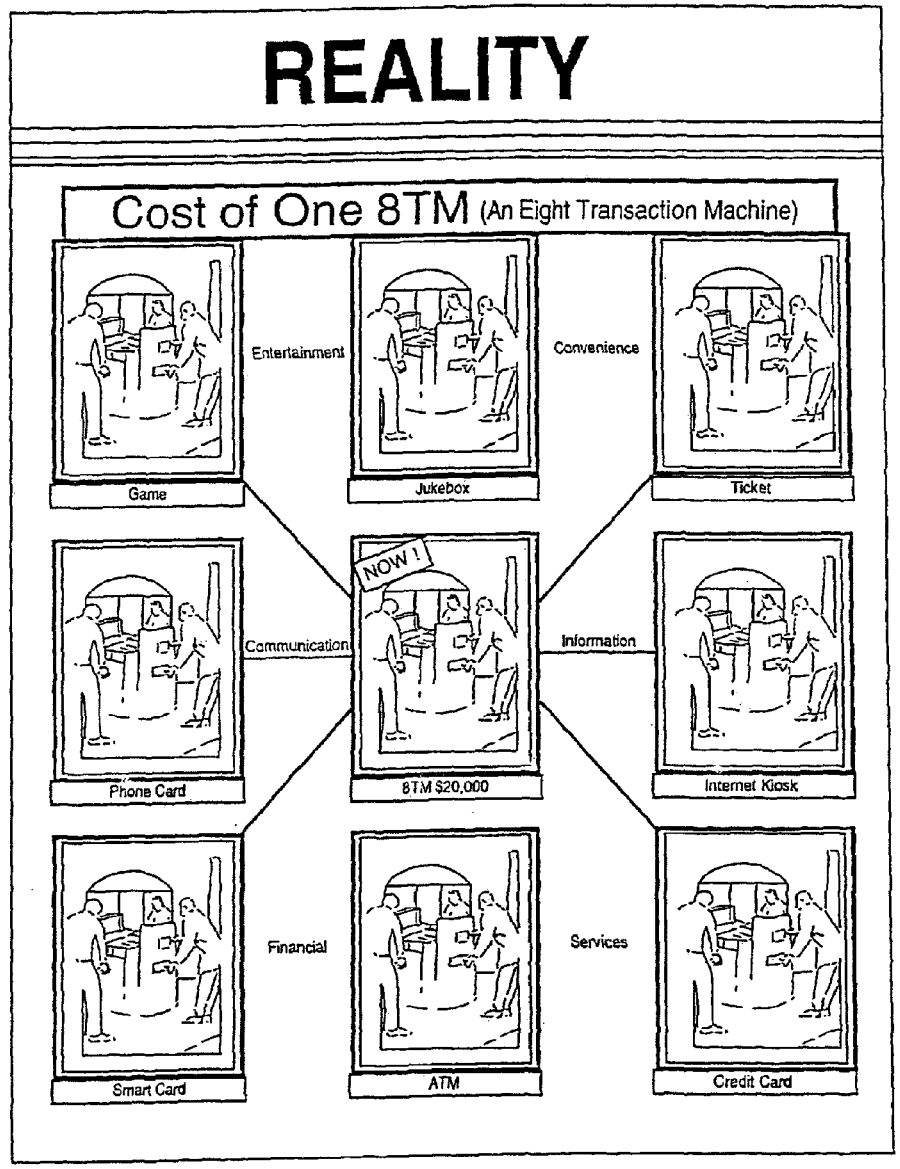
FIG. 2 is a schematic entitled "REALITY" which illustrates the various existing goods and services machines which can be combined in accordance with the present invention.

Referring now to FIGS. 1 and 2, a plurality of machines is shown which can be combined in a single integrated system according to the present invention. However, not all the machines shown need be combined. The invention can be simply the combination of a telephone and a juke box, for example, with the hardware and functions of credit or smart card reading (or encoding), computer hardware and software and audio sound production and reproduction being shared. However, the preferred embodiments of the present invention include an integrated but otherwise traditional ATM, so as to enhance the overall retail sales and services offering by coordinating payment arrangements and generalized banking services with the retail transaction(s). This combination of providing an ATM with other retail goods and services transactions is not only new, but would heretofore have been considered virtually heretical.

The essence of the preferred embodiments of the invention thus resides in the new combination of previously existing but separate means of access to the stream of daily commerce and banking. Meaningful combinations of ATMs and customer retail kiosks have never even been attempted before, possibly because the two technologies have undergone burgeoning technological growth in separately focused directions. For example, certain telephone systems have been promoted as the "ATMs of the future," providing credit card recognition for instant, albeit remote, execution of retail services. Some ATMs dispense both bills and coin change, and offer services such as on-site check cashing with payment of the exact check amount in bills and/or coins. As described above, ATMs in the past have offered limited retail sales options such as the vending of postage stamps via the bill dispenser. But there has not been, heretofore, a meaningful incarnation of a single system, which an individual consumer can use in a single location, wherein real banking services, and real commercial and banking services, have been combined. Because it is difficult to define objectively, however, that which constitutes real or meaningful banking or retail services, the preferred embodiments of the invention are best characterized as providing a retail terminal offering at least two immediately accessible goods or services and selectively dispensing at least two forms of dispensable currency, to emphasize the novel plurality of uniquely combined system means intrinsic to the present invention. The system for providing these multiple services or goods is integrated, moreover; the invention does not comprise the mere freestanding combination of an existing ATM and an existing retail terminal in adjacent proximity.

One of the preferred embodiments of the present invention is that disclosed in U.S. patent application Ser. No. 08/643,827 entitled "Automated League and Tournament Device." Two goods or services offered are ATM services and game league services, and the two forms of dispensable currency take the form of bills from the bill safe/dispenser and the encodable credit made possible by the smart card encoder therein. Widespread variability is possible with respect to such combinations.

Another embodiment of the invention includes the following components. A free-standing or wall mounted ATM with traditional ATM hardware, software and banking network connections (and including a bill safe, bill dispenser, magnetic stripe card reader, keyboard and video screen) is augmented with additional means as follows. The ATM is fitted with a smart card reader/encoder, so that in addition to the traditional bill dispenser the ATM can dispense encodable currency onto a smart card or its equivalent (a PC card, a removable hard drive, or other means for encoding digital cash or electronic cash of various types.) The video screen is a touchscreen; internal software provides a first screen menu for selection of traditional ATM services and at least two additional immediate access retail services, which are selected from the group consisting of electromechanical games of skill services, smartcard services, insurance services, restaurant services, travel services, sports services, gaming device services, delivery services, coupon services, floral delivery services, gift basket delivery services, introduction services, audio services, news services transportation services, utility services, physician services, school services, security services, building services, credit services, directory services, home services, military services, personal services, automotive services, employment services, recreational services, travelers check services, children's services, videogames of skill services, Internet services, brokerage services, government services, entertainment services, library services, catalogue services, print services, diagnostic services, chat services, video services, database services, barter services, engineering services, pharmacy services, identification services, detective services, church services, loan services, training services, buying services, recruitment services, accounting services, photographic services, food services, radio services, credit services, theme park services, music services, financial services, full-line vending services, health care services, remote access services, payment services, computer services, search services, network services, subscription services, virtual reality services, advertising services, rental services, programming services, beverage services, credit/debit card services, freight services, stored value card services, beauty services, tax services, leasing services, medical services, emergency services, publishing services, counseling services, satellite services, screening services, real estate services, telephone services, ticket services, television services, dating services, information services, lottery services, software services, reservation services, communication services, Intranet services, adult services, referral services, repair services, legal services, consulting services, maintenance services, moving services, trade show services, design services, lodging services, mail services, fast food services, automated services, recording services, clothing services, wireless services, human services, and encryption services. For the purpose of this embodiment, the form such second service takes must be an immediately realizable service, with a good or service being generally immediately rendered to the individual using the system (airline or theatre tickets being printed on the spot, for example) or being separately commenced (initiation of a delivery of flowers in a remote city, for example). It is readily apparent that this combination system is quite different from any of prior art ATMs, telephone ATMs "of the future," or even personal computer Internet connections which may provide retail functions but do give access to at least two forms of dispensable currency.

The most preferred embodiments of the present invention include means for providing at least two retail services which are not only immediately, realizable but are also immediately accessible to the individual user. Preferred immediate access services include game of skill services, music (juke box) services, vending, publishing (customized newspapers printed on the spot, for example), dating, smart card encryption, travel and entertainment ticketing, and financial, insurance and brokerage services. The consumer appeal of synthesized commercial and retail services with banking services is enormous, which in itself highlights the irony that these diverse services, and the means for providing them, have never been combined elsewhere heretofore.

User access to systems provided according to the invention will normally be accomplished by credit card, smart card or other identification card, but other means are contemplated as within the scope of the invention. Literally any means of positive identification of any given individual user to the system can be implemented, such as iris or fingerprint scans and matching to user databases. Smart card access itself will undoubtedly continue to evolve as smart cards increase in their accommodation of data and processing speed and ability, and this will only enhance the multiple retail and banking aspects of the preferred embodiments of the invention.

Figure 3A:
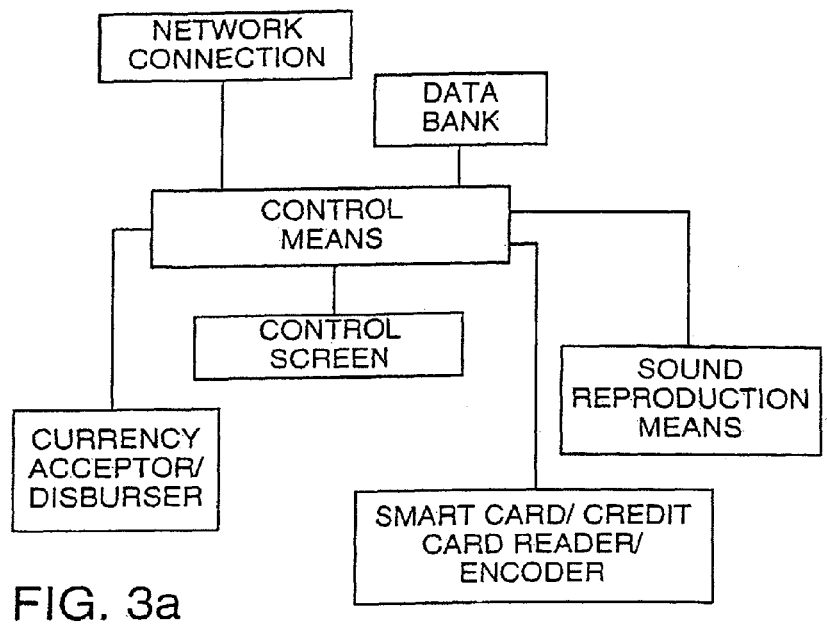
FIGS. 3a-3e are schematics which show various combinations of integrated systems according to the present invention.
Figure 3B:
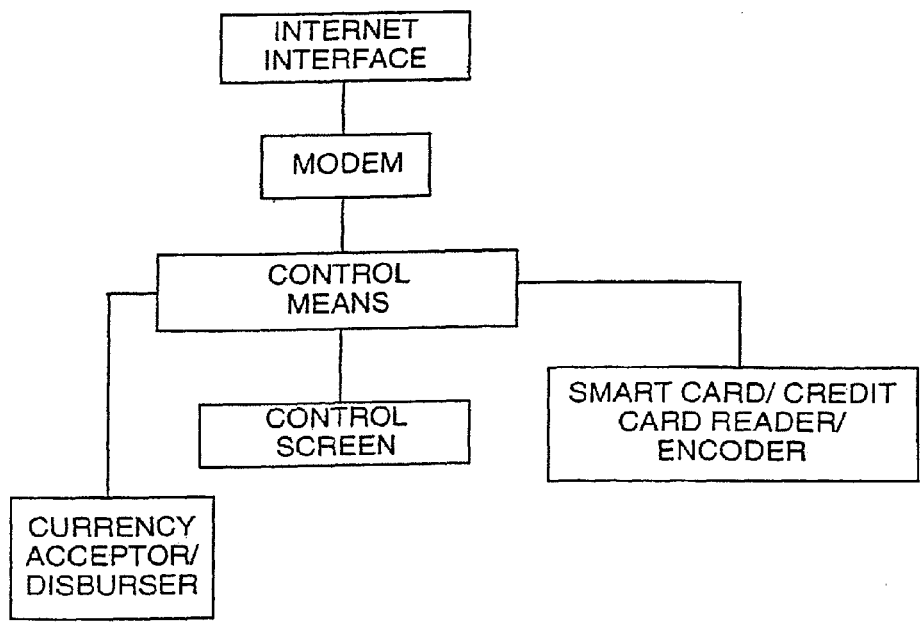
Figure 3C:
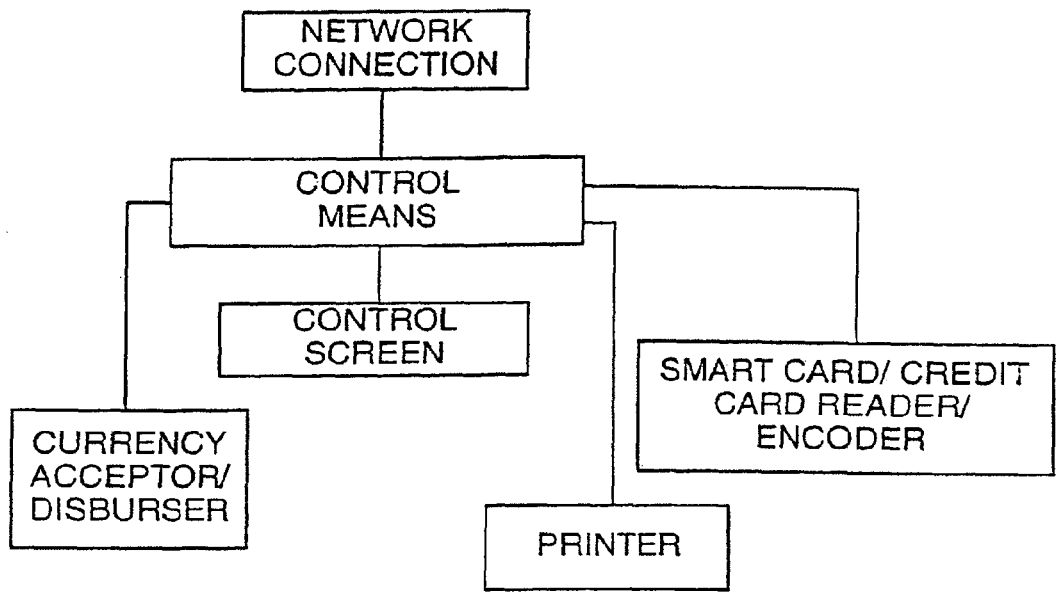
Figure 3D:
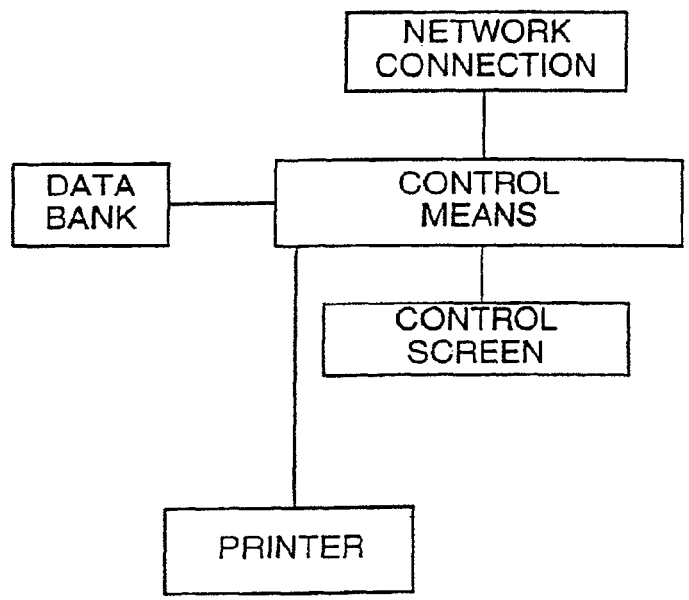
Figure 3E:
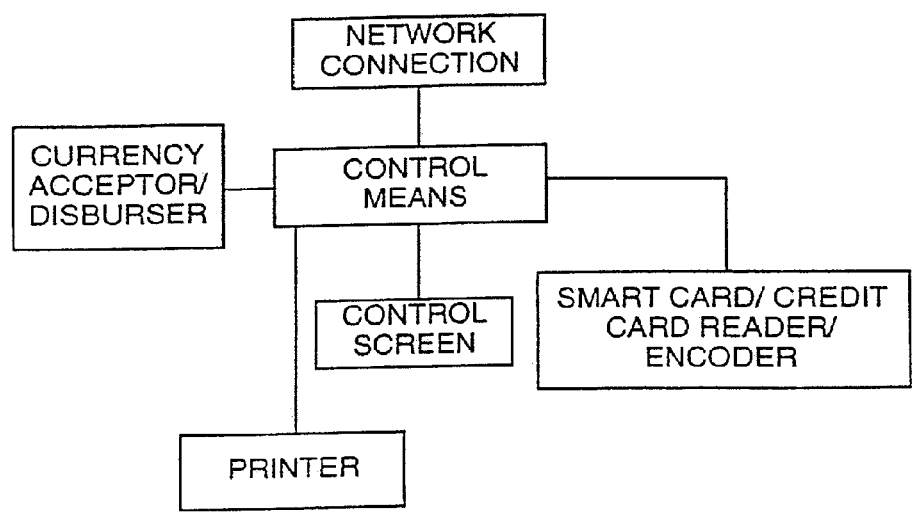

Referring now to FIGS. 3a-3e, five exemplary system combinations are illustrated schematically. FIG. 3a illustrates a combined ATM and juke box system; FIG. 3b illustrates a combined ATM and Internet retail terminal; FIG. 3c shows a combined ATM and insurance policy terminal; FIG. 3d illustrates a combined dating service and travel ticketing terminal; and FIG. 3e illustrates a combined ATM and lottery dispensing machine. These combinations are exemplary of the various conceptual incarnations of the invention as described above.

Figure 4:
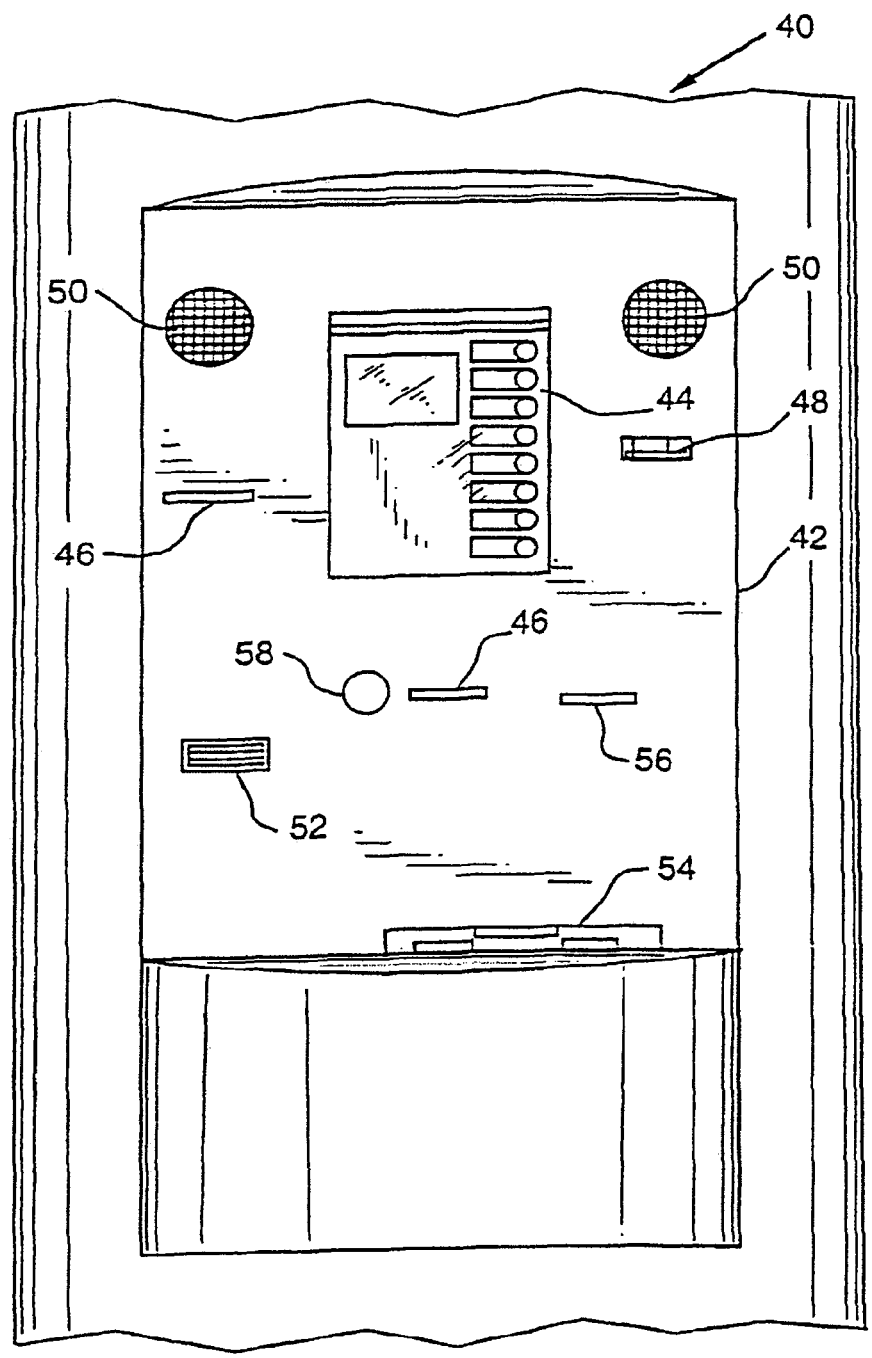
FIG. 4 is a side elevational view of a control panel according to a preferred embodiment of the invention.

Referring now to FIG. 4, the multiple functionalities can be combined via a video touchscreen which provides for selection of a wide variety of goods and/or services. FIG. 4 is a partial side elevational view of a kiosk 40 including a control panel 42 having a video command touchscreen 44, at least one smart card dispenser 46, a credit card reader 48, stereo speakers 50, a bill (cash) acceptor 52, a bill dispenser 54 and a receipt (printer) dispenser 56. Optionally, one of the smart card dispensers 46 may be recording means for encoding information on media other than smart cards, including but not limited to magnetic recording tape; floppy or removable hard disks or drives; recordable CDs, PC cards or PCMCIA cards and etc. A motion/sound/position sensor 58 is also provided adjacent the video command touchscreen. A person using the control panel 42 thus has access to all available goods and/or services in a single location.

Figure 5:
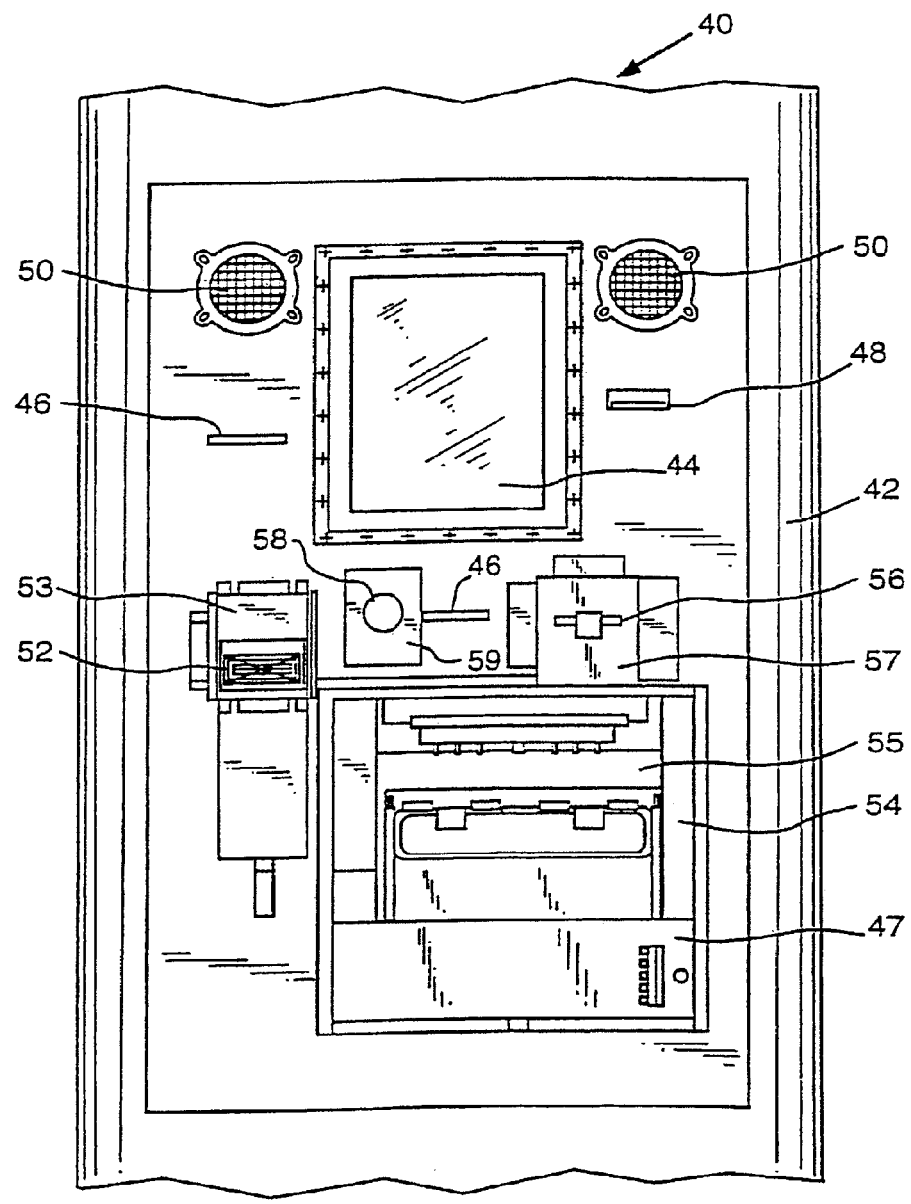
FIG. 5 is a side elevational view of the same mechanics as shown in FIG. 4 but with the control panel removed.

FIG. 5 illustrates the control panel 42 of FIG. 4 with its cover removed, exposing the underlying mechanical features not including the computerized control and optional network access means which drive the system. A bill dispenser security safe 55 is thus positioned surrounding the bill dispenser 54. A bill acceptor mechanism 53 known in the art supports the bill acceptor A smart card safe 47 contains smart card inventory to supply to the smart card dispenser(s) 46. A motion/sound/position device 59 supports the sensor 58. A printer 57 provides receipts or other printed materials to the receipt (printer) dispenser 56. Each individual mechanism illustrated in FIGS. 4 and 5 is known in the art, and the invention combines a number of them in a novel and commercially irresistible way.

FIGS. 4 and 5 illustrate a video command touchscreen which is deliberately in portrait rather than landscape orientation. This deliberate orientation enhances the suitability of the command screen to relatively long, single-column selection menus such as those of the World Wide Web on the Internet and also adds an attractive design feature to the kiosk containing it.

Figure 6:
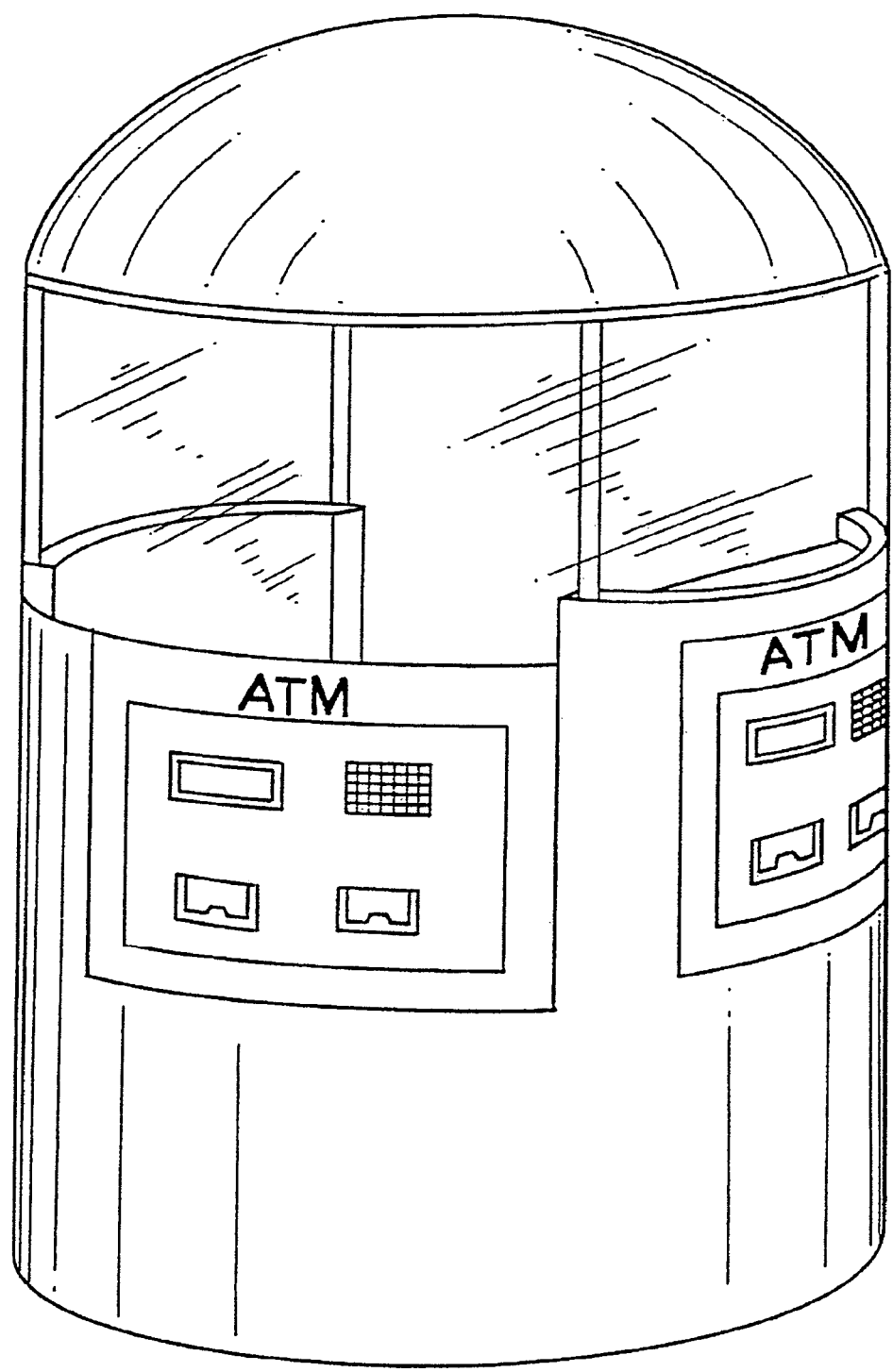
FIG. 6 is a perspective view of a further embodiment of the invention which combines multiple transaction stations in a kiosk, which might house any retail function, such as automobile service and refueling or fast food dispensing or vending.

FIG. 6 illustrates a kiosk containing multiple transaction control panels similar to those of FIG. 4. A kiosk such as shown can house games, automobile refueling or fast food services in automated form, or virtually any other goods or services disclosed herein.

Figure 7A:
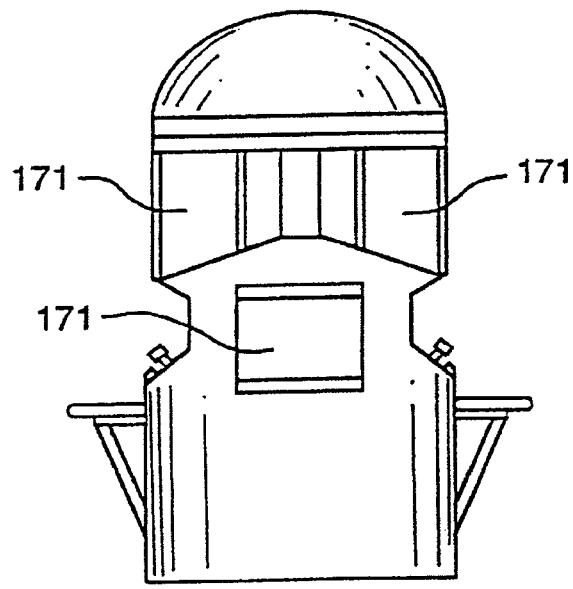
FIGS. 7a and 7b are side elevational views of a yet further embodiment of the invention.
Figure 7B:
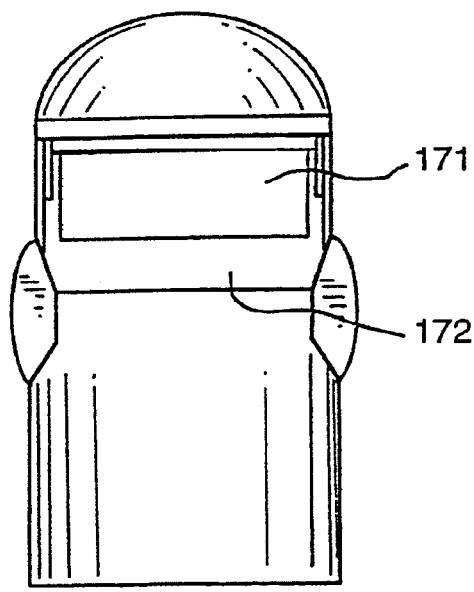

FIGS. 7a and 7b are side elevational views of a further embodiment of the invention. Segments 171 can house monitors, liquid crystal or gas plasma displays; segment 172 can house three dimensional volumetric displays including electromechanical games or displays or three dimensional video or holographic arrays. Kiosks such as are shown in FIGS. 7a and 7b may have, optionally, fold down seating and/or modular construction.

The invention is susceptible of widespread departure from the above disclosure without departing from the scope of the invention. Virtually any heretofore uncombined goods and/or services provision may be combined in the automated transaction terminal of the present invention. The key to the invention is the multiple functioning of the terminal as compared to primarily single purpose devices of the prior art. Another way of understanding the most preferred embodiments of the present invention is as an ATM combined with an additional functionality typically found, in the prior art, only in its own freestanding device, i.e., juke box, Internet terminal, etc. Combinations of individual goods and services can be customized to the theme or character of the intended location, and the combinations are thus deliberate, not slapdash.

Notwithstanding the foregoing description, the invention is only to be limited as is set forth in the accompanying claim.

The invention claimed is:

1. An integrated payment and transaction system for use by a consumer, comprising:
   an automated transaction machine;
   means for providing government services in the form of a passport application and delivery service to the consumer; and
   at least one network connection to the Internet and at least one network connection to the automated transaction machine.

2. The integrated payment and transaction system according to claim 1, further comprising a smart card reader/encoder, a passport reader/encoder, and a sensor.

3. The integrated payment and transaction system according to claim 2, wherein the sensor enables selective recording of a human fingerprint or iris scan or both to a passport.

4. The integrated payment and transaction system according to claim 1, wherein said automated transaction machine is capable of selectively dispensing a passport to the consumer.

5. The integrated payment and transaction system according to claim 4, further comprising means for selectively printing or publishing information on a passport via a printer.

6. The integrated payment and transaction system according to claim 4, wherein said passport is on removable media.

7. The integrated payment and transaction system according to claim 4, further comprising means for selectively dispensing a combination of a passport and smart card, credit card, debit card, stored value card or gift card.

8. The integrated payment and transaction system according to claim 1, wherein said at least one network to the automated transaction machine includes a local area network (LAN).

9. A method of providing government services in the form of passport services and transaction capability to a consumer in a single automated transaction machine, comprising the steps of:
   providing automated transaction machine access to the consumer via the automated transaction machine;
   providing the consumer with access to government passport services via an Internet protocol (IP) network connection to the automated transaction machine; and
   realizing a retail transaction.

10. The method of providing government services in the form of passport services and transaction capability according to claim 9, further comprising the step of providing such services via a smart card interface.

11. The method of providing government services in the form of passport services and transaction capability according to claim 9, further comprising the step of dispensing a passport via the automated transaction machine.

12. The method of providing government services in the form of passport services and transaction capability according to claim 9, wherein the consumer can realize a transaction for additional goods or services, the goods or services being selected from the group consisting of banking services, electromechanical games of skill services, smart card services, insurance services, restaurant services, travel services, sports services, gaming device services, delivery services, coupon services, gift basket delivery services, introduction services, audio services, news services, transportation services, utility services, physician services, school services, security services, building services, directory services, home services, military services, personal services, automotive services, employment services, recreational services, travelers/check services, children's services, videogames of skill services, Internet services, brokerage services, government services, entertainment services, library services, catalogue services, print services, diagnostic services, chat services, video services, database services, barter services, engineering services, pharmacy services, identification services, detective services, church services, loan services, training services, buying services, recruitment services, accounting services, photographic services, food services, radio services, credit services, theme park services, music services, financial services, full-time vending services, health care services, remote access services, payment services, computer services, search services, network services, subscription services, virtual reality services, advertising services, rental services, programming services, beverage services, credit/debit card services, freight services, stored value card services, beauty services, tax services, leasing services, medical services, emergency services, publishing services, counseling services, satellite services, screening services, real estate services, telephone services, ticket services, television services, dating services, information services, lottery services, software services, reservation services, communication services, Intranet services, adult services, referral services, repair services, legal services, consulting services, maintenance services, moving services, trade show services, design services, lodging services, mail services, fast food services, automated services, recording services, clothing services, wireless services, human services and encryption services.

13. The method of providing government services in the form of passport services and transaction capability according to claim 9, further comprising the step of dispensing a combined passport and removable media publication.

14. The method of providing government services in the form of passport services and transaction capability according to claim 9, further comprising the step of dispensing a passport and one or more of a smart card, credit card, debit card, stored value card, identification card or gift card.

15. An integrated payment and transaction apparatus for use by a consumer to purchase a passport, comprising:
   an automated transaction machine;
   an Internet protocol (IP) network to the automated transaction machine to provide the consumer access to governmental services for obtaining a passport; and
   a user interface to the automated transaction machine, wherein the consumer can purchase the passport through the use of the user interface and the Internet protocol (IP) network connection.

16. The integrated payment and transaction apparatus according to claim 15, further comprising means for consummating the purchase of the passport with currency in the form of bills.

17. The integrated payment and transaction apparatus according to claim 15, further comprising means for consummating the purchase of the passport with electronic currency, digital currency, electronic cash or digital cash.

18. The integrated payment and transaction apparatus according to claim 15, further comprising means for consummating the purchase of the passport with encodable credit, a debit card, a credit card, a smart card, a stored value card or a payment card.

19. The integrated payment and transaction apparatus according to claim 15, further comprising means for consummating the purchase of the passport with an identification card, or with removable media encoded with digital or electronic currency.

20. A method for a consumer to purchase a passport from an identification service via an automated transaction machine comprising the steps of:
   providing automated transaction machine access to the consumer via the automated transaction machine;
   providing Internet protocol (IP) network access to the consumer via the automated transaction machine, such that the consumer can access the identification service; and
   purchasing a passport from the identification service.

21. The method for a consumer to purchase a passport according to claim 20, further comprising the step of purchasing the passport with bills.

22. The method for a consumer to purchase a passport according to claim 20, further comprising the step of purchasing the passport with electronic currency, digital currency, electronic cash or digital cash.

23. The method for a consumer to purchase a passport according to claim 20, further comprising the step of purchasing the passport with encodable credit, a debit card, a credit card, a smart card, stored value card or payment card.

24. The method for a consumer to purchase a passport according to claim 20, further comprising the step of purchasing the passport with an identification card, or with a removable media encoded with digital or electronic currency.

* * * * *